Figure 1:
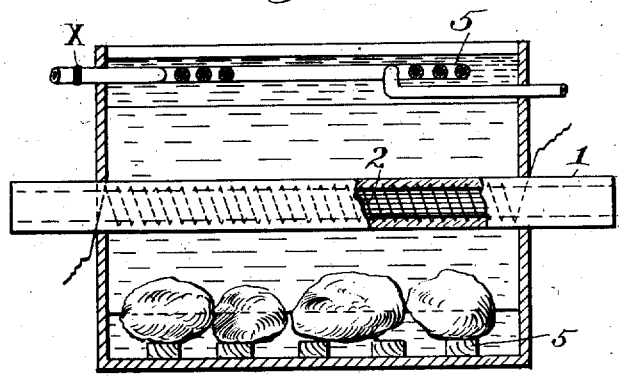

A. R. BULLOCK.
PROCESS OF IMPREGNATING SUBSTANCES.
APPLICATION FILED DEC. 17, 1910.

1,035,777.

Patented Aug. 13, 1912.

Witnesses.
E. B. Gilchrist,
H. R. Sullivan.

Inventor
Arthur R Bullock
by Thurston & Kwis
attys

UNITED STATES PATENT OFFICE.

ARTHUR R. BULLOCK, OF CLEVELAND, OHIO.

PROCESS OF IMPREGNATING SUBSTANCES.

1,035,777.  Specification of Letters Patent.  Patented Aug. 13, 1912.

Application filed December 17, 1910. Serial No. 597,764.

*To all whom it may concern:*

Be it known that I, ARTHUR R. BULLOCK, a citizen of the United States, residing at Cleveland, in the county of Cuyahoga and State of Ohio, have invented a certain new and useful Improvement in Processes of Impregnating Substances, of which the following is a full, clear, and exact description.

This invention relates to a process by which solid or substantially solid substances may be impregnated with other substances or agents. As specific examples I may mention the curing or preserving of meat, hides, or other forms of animal, as well as vegetable matter and also the tanning of hides, although the process may be advantageously used in instances other than those cited.

Referring to the instances given above, it is well known that it requires a long time to effect the desired result, for at present they are almost entirely practised, commercially, by simply immersing the substance to be treated in a proper solution to effect the result desired. The length of time thus required is due to the slow penetration of the treating agent into the fibers or tissue of the substance treated, which penetration takes place in accordance with well known physical laws.

It is the object and purpose of this invention to provide a process which will materially hasten the impregnation of the substance treated and thus reduce the length of time required to perfect the treatment, and moreover it is my belief that the impregnation of the substance will be much more complete and uniform than is at present the case. There is a certain amount of impregnation which takes place merely by the immersion of the substance to be treated in the impregnating solution for the time during which the treatment takes place. However, the process herein disclosed causes the impregnation of the substance substantially entirely by the use of the magnetic field of varying density, as will later be explained.

I am well aware that it has heretofore been proposed to use a direct, as well as an alternating current in the curing and preserving of substances and the tanning of hides, and the process involved consists essentially in causing a current either direct or alternating to pass between electrodes placed within a tank which contains the preserving or curing solution, in which solution the substances to be treated are immersed.

The main objection to the processes which have just been outlined lies in the fact that in the beginning of the processes the current passing through the tank will naturally take the path of least resistance, which is the solution, and the current will for the most part pass around the substances within the tank, and not enter and pass through them. It is only after the process has progressed and the solution penetrates the substances to an appreciable extent that the current becomes really effective.

The process herein disclosed may be said to consist essentially in bringing the substance to be treated into proper contact relation with the treating substance or substances, with which it is desired to impregnate the first mentioned substance and then subjecting the substances to the action of a magnetic field, the density of which is continually changing. It is my belief that the treating substance or substances will be most effective for use when dissolved to form a proper solution, or at least they should be in a semi-solution or plastic condition. Just what action the magnetic flux may have upon the substance to be impregnated, I cannot state with certainty, but it is my belief that a current of electricity is induced within the substance, and the treating agent or substance, and either this current thus induced or the magnetic flux itself causes a flexing of the fibers of the substance being treated so as to permit the impregnation of the substance by the treating agent in a shorter length of time than would otherwise be possible to attain. Whether this theory be entirely correct or not is a matter of little moment, inasmuch as I have been able to cure a side of bacon in less than six hours, whereas the process as at present practised requires from twenty-five to forty days, and as I am informed, even the process involving the use of the electric current which I have previously outlined, requires substantially three or four days. I have also found that the treatment is hastened by causing the density of the magnetic flux to change with great rapidity, and by the term "great rapidity" I mean to say that there are more than three hundred changes or pulsations per second, and therefore if there be a current induced in the treating agent and substance being treated, this current will have a frequency of more than three hundred alterations, or one hundred and fifty cycles per second. In practice I have used to advantage an induction apparatus, to the primary windings of which was supplied an alternating current having a frequency of 500 cycles. The magnetic flux may be produced either by a pulsating direct current or an alternating, when used with a suitable induction apparatus, such as will be later described, and by the term "pulsating direct current" I mean to include a direct current, the pulsations of which are produced in any manner whatsoever, and which results in the changing of the density of the magnetic flux.

As a concrete example, I shall describe my process as used in the curing of meat, although it will be understood that this is only for purposes of disclosure, and forms no restriction to its use in other relations.

Reference should be had to the accompanying drawings forming a part of this application, which illustrate two of a large variety of forms which the apparatus for practising the process may assume.

Figure 2:
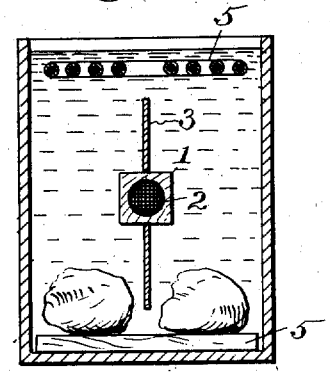
Figure 3:
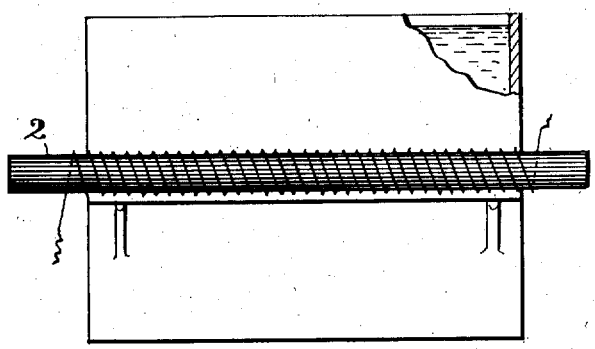

Figure 1 is a vertical longitudinal section through the tank; Fig. 2 is a section at right angles to the showing in Fig. 1; Fig. 3 is a side elevation of a modified form of apparatus; and Fig. 4 is a vertical cross section of the showing in Fig. 3.

In the form of apparatus shown in Fig. 1, a chute 1 extends through the tank and is supported by the end walls. Through the chute there extends a core of magnetically permeable material such as solid iron or iron wire, which is wound with an electric conductor represented at 2. The conductor 2 at its terminals is electrically connected with a source of electric current which as before stated, is some form of a pulsating current, either a pulsating direct current, or an alternating current. Extending above and below the central chute 1 are partition members 3 and 4, which members extend from end to end of the tank, but stop short of the bottom and the top thereof. When the tank is filled with solution, the top level of the same is always above the top of the partition 3, and by the provision of the members 3 and 4, I believe that the circulation of the current through the solution in the tank is directed and controlled to flow in a given path. I have found that in the curing of bacon and hides there is no necessity of cooling the solution in the tank, but if in the treatment of other substances, or even in the case of bacon, it is desired, or found necessary to cool, I have provided the cooling coil 5 which is suitably supported in the upper part of the tank and through which may be circulated a cooling medium. Care should be taken that the cooling coil does not form a conductor for the induced current and to obviate this I have shown the insulated section $x$ inserted as a part of the coil. By using a cooling coil placed as mentioned, circulation of the brine solution will be obtained due to the fact that the solution in contact with the coils upon being cooled becomes denser than the other solution, and consequently sinks to the bottom of the tank, while the warm solution rises to the top of the tank into contact with the cooling coils. As will be apparent, this circulation is continuous. Suitable racks, such as indicated at 5 are provided, upon which the meat or substance to be cured may rest.

Figure 4:
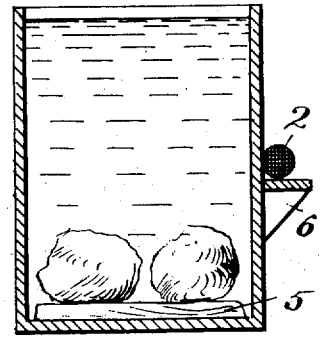

In the form of apparatus shown in Figs. 3 and 4, the core and its windings are supported outside of the tank but the tank and magnet are in proper relation so that the magnetic field developed by the magnet may affect the material within the tank. For the purpose of supporting the magnet, I have shown a bracket 6 secured upon the side of the tank but it will be evident that other means for supporting the magnet may be employed with equal facility.

When the electric current is caused to pass through the conductor 2, a magnetic field of force will be developed which will radiate in substantially all directions from the magnet, and inasmuch as a pulsating direct or alternating current is used, the magnetic field of force will be continually changing in density. The solution and material within the tank are conductors of electricity, at least to a certain extent, and therefore inasmuch as they are enveloped by the magnetic field of continually changing density, in all probability there will be induced in the contents of the tank, a secondary or induced current, and according to the theory of the induced current, this current will be induced in every particle of the contents of the tank, both solid and liquid. It is my opinion that under the influence of the magnetic field of force continually changing in density, or under the influence of the induced current, the fibers of the meat or other substances being treated, will be caused to alternately flex or expand and contract, and in this manner, the treating agent is more rapidly and effectively introduced into the innermost portions of the substance being impregnated in a short period of time. Whether the theory which has just been advanced is the true one or not is quite immaterial, so far as the results obtained are concerned, and therefore I do not wish it to be understood that my process necessarily depends upon this theory. It is simply advanced as a possible explanation of the phenomenon which takes place. The hastening of the impregnating process takes place when a current of any pulsating or frequency value is used, and I have obtained successful results when employing an alternating current of from 60 to 100 cycles. However, I have found that more marked results are obtained by the use of a current of high frequency or pulsating value than where the current of lower frequency is used. I have found that a high frequency current enables me to use a core containing much less material, and therefore more convenient to handle, than is the case with the core when using a low frequency current. A further advantage lies in the fact that the voltage in the secondary or the solution and contents of the tank is more uniform at distances away from the core and does not drop off so rapidly when the high frequency current is used as when the low frequency is used. An added advantage will be found in the difference between the power consumption when using the low frequency and the high frequency current, for I have found that the high frequency current results in a lower wattage consumption than with the use of low frequency current. But what I consider to be the most important result is that in using the current of high frequency I am enabled to effect the impregnation in a much shorter period of time than when using a current of low frequency, and therefore if for no other reason, the high frequency current is of the greatest advantage and importance.

Attention is called to the fact that the cooling required in practising my process is a minimum and this is for the reason that the induced current produces practically no heat in passing through the solution and substances in the tank. In a tank 31 inches long and 18 inches wide and 24 inches deep, which is the size of tank I have used, there is an ohmic resistance of only .04 of an ohm, when the tank is filled to within two or three inches of the top. From this it will be clear that there could be no great amount of heat generated due to the passage of the current through a conductor of such low resistance. In the experiments with the high frequency current the curing has been performed while maintaining a temperature of substantially 60° within the tank, and it has been found that it is only necessary to cool sufficiently to counteract the effect of the temperature of the surrounding atmosphere. The amount of this cooling is practically negligible and in this respect my process clearly distinguishes from those electrical processes wherein electrodes are immersed within the tank. In the practice of such processes, it has been found that the cooling of the contents of the tank is of the utmost importance, and further is probably the most expensive item in the practice of the process.

In the form of apparatus shown in Figs. 1 and 2 of the drawing, the magnetic field which is developed by the magnet extends equally upon both sides of the magnet and envelops the contents of the tank, whereas in the form shown in Figs. 3 and 4, the magnet is without the tank, but of course is placed in such position with relation to the tank that the contents will be enveloped at least by a portion of the magnetic flux. Therefore it will be clear in both cases above mentioned that the conductor, both the solution and the substance in the tank, are intersecting or cutting a certain number of the magnetic lines of force which are developed when the magnet is energized.

Having described my invention, I claim:

1. The process of impregnating one substance with another substance or substances, which consists in bringing the substance to be treated and the treating substance or substances into proper contact with each other, and causing the impregnation of the substance to be treated substantially entirely by the action upon the aforesaid substances of a magnetic field of changing density.

2. The process of impregnating one substance with another substance or substances, which consists in bringing the substance to be treated and the treating substance or substances into proper contact with each other, and subjecting them to the action of a magnetic field, the density of which changes with great rapidity.

3. The process of impregnating one substance with another substance or substances, which consists in immersing the substance to be treated in a suitable solution containing the treating substance or substances, and causing the impregnation of the substance to be treated substantially entirely by the action upon the aforesaid substances of a magnetic field of charging density.

4. The process of impregnating one substance with another substance or substances, which consists in bringing the substances to be treated and the treating substance or substances into proper contact relation with each other, and causing the impregnation of the substance to be treated substantially entirely by the action upon the aforesaid substances of a secondary or induced current which is set up in the said substances.

5. The process of impregnating one substance with another substance or substances, which consists in bringing the substance to be treated and the treating substance or substances into proper contact relation with each other, and causing a secondary or induced current of high frequency to be set up in both substances.

In testimony whereof, I hereunto affix my signature in the presence of two witnesses.

ARTHUR R. BULLOCK.

Witnesses:
A. J. HUDSON,
H. R. SULLIVAN.

---

Correction in Letters Patent No. 1,035,777.

It is hereby certified that in Letters Patent No. 1,035,777, granted August 13, 1912 upon the application of Arthur R. Bullock, of Cleveland, Ohio, for an improvement in "Processes of Impregnating Substances," an error appears in the printed specification requiring correction as follows: Page 3, line 120, for the word "charging" read *changing;* and that the said Letters Patent should be read with this correction therein that the same may conform to the record of the case in the Patent Office.

Signed and sealed this 17th day of September, A. D., 1912.

[SEAL]

C. C. BILLINGS,
*Acting Commissioner of Patents.* stances of a secondary or induced current which is set up in the said substances.

5. The process of impregnating one substance with another substance or substances, which consists in bringing the substance to be treated and the treating substance or substances into proper contact relation with each other, and causing a secondary or induced current of high frequency to be set up in both substances.

In testimony whereof, I hereunto affix my signature in the presence of two witnesses.

ARTHUR R. BULLOCK.

Witnesses:
A. J. HUDSON,
H. R. SULLIVAN.

---

Correction in Letters Patent No. 1,035,777.

It is hereby certified that in Letters Patent No. 1,035,777, granted August 13, 1912 upon the application of Arthur R. Bullock, of Cleveland, Ohio, for an improvement in "Processes of Impregnating Substances," an error appears in the printed specification requiring correction as follows: Page 3, line 120, for the word "charging" read *changing;* and that the said Letters Patent should be read with this correction therein that the same may conform to the record of the case in the Patent Office.

Signed and sealed this 17th day of September, A. D., 1912.

[SEAL].

C. C. BILLINGS,

*Acting Commissioner of Patents.*

Correction in Letters Patent No. 1,035,777.

It is hereby certified that in Letters Patent No. 1,035,777, granted August 13, 1912 upon the application of Arthur R. Bullock, of Cleveland, Ohio, for an improvement in "Processes of Impregnating Substances," an error appears in the printed specification requiring correction as follows: Page 3, line 120, for the word "charging" read *changing;* and that the said Letters Patent should be read with this correction therein that the same may conform to the record of the case in the Patent Office.

Signed and sealed this 17th day of September, A. D., 1912.

[SEAL]

C. C. BILLINGS,

*Acting Commissioner of Patents.*